(12) United States Patent
Zhang et al.

(10) Patent No.: US 9,823,799 B2
(45) Date of Patent: Nov. 21, 2017

(54) ONE GLASS SOLUTION TOUCH PANEL AND FABRICATING METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jian Zhang, Beijing (CN); Binbin Cao, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 19 days.

(21) Appl. No.: 15/133,383

(22) Filed: Apr. 20, 2016

(65) Prior Publication Data

US 2016/0370891 A1    Dec. 22, 2016

(30) Foreign Application Priority Data

Jun. 16, 2015    (CN) .......................... 2015 1 0334229

(51) Int. Cl.
*G06F 3/045*    (2006.01)
*G06F 3/044*    (2006.01)

(52) U.S. Cl.
CPC .... *G06F 3/044* (2013.01); *G06F 2203/04103* (2013.01); *G06F 2203/04111* (2013.01)

(58) Field of Classification Search
CPC .......... G06F 3/041; G06F 3/044; G06F 3/045; G06F 3/0488; G06F 3/04886; G06F 2203/04103; G06F 2203/04111
See application file for complete search history.

(56) References Cited

U.S. PATENT DOCUMENTS

| 2008/0309633 | A1* | 12/2008 | Hotelling | G06F 3/0412 345/173 |
| 2010/0033668 | A1* | 2/2010 | Koito | G02F 1/13338 349/155 |

(Continued)

FOREIGN PATENT DOCUMENTS

| CN | 101464761 A | 6/2009 |
| CN | 102693056 A | 9/2012 |

(Continued)

OTHER PUBLICATIONS

China First Office Action, Application 201510334229.3, dated Jun. 3, 2017, 24 pps. with English translation.

*Primary Examiner* — Joe H Cheng
(74) *Attorney, Agent, or Firm* — Armstrong Tesadale LLP (57) ABSTRACT

A method for fabricating a one glass solution touch panel is provided. The method includes forming a protective layer on a first surface of a substrate, and forming a black matrix, a plurality of first electrodes, a plurality of second electrodes, a first over coat layer, and a plurality of conductive bridges on a second surface of the substrate, wherein the second surface includes a visual area in which the first electrodes and the second electrodes are arranged in an alternating pattern, and a non-visual area where the black matrix is provided, wherein the second electrode includes a plurality of conductive lumps, wherein each of the conductive lumps is located between adjacent first electrodes, wherein the first over coat layer separates the conductive lumps from the first electrodes, and wherein each conductive bridge connects the conductive lumps belonging to the same second electrode.

19 Claims, 3 Drawing Sheets

(56) References Cited

U.S. PATENT DOCUMENTS

| | | | | |
|---|---|---|---|---|
| 2010/0283757 A1* | 11/2010 | Wu | G06F 3/044 | 345/174 |
| 2011/0310033 A1* | 12/2011 | Liu | G06F 3/044 | 345/173 |
| 2012/0075257 A1* | 3/2012 | Choi | G06F 3/044 | 345/176 |
| 2012/0262385 A1* | 10/2012 | Kim | G06F 3/044 | 345/173 |
| 2013/0293508 A1* | 11/2013 | Lin | G06F 3/044 | 345/174 |
| 2014/0168138 A1* | 6/2014 | Kuo | G06F 3/0412 | 345/174 |
| 2014/0320761 A1* | 10/2014 | Misaki | G06F 3/044 | 349/12 |
| 2014/0333556 A1* | 11/2014 | Lin | G06F 3/041 | 345/173 |
| 2015/0036064 A1* | 2/2015 | Zhou | G06F 3/0412 | 349/12 |
| 2015/0062035 A1* | 3/2015 | Choi | G06F 3/047 | 345/173 |
| 2015/0167177 A1* | 6/2015 | Choi | H03K 17/9618 | 200/5 R |
| 2016/0077645 A1* | 3/2016 | Chien | G06F 3/0412 | 349/12 |
| 2016/0109741 A1* | 4/2016 | Lee | G02F 1/13338 | 349/12 |
| 2016/0109980 A1* | 4/2016 | Lee | G06F 3/044 | 345/174 |
| 2016/0224151 A1* | 8/2016 | Goto | G06F 3/044 | |
| 2016/0340773 A1* | 11/2016 | Ochi | C22C 21/00 | |
| 2016/0342245 A1* | 11/2016 | Zhou | G06F 3/044 | |
| 2016/0342256 A1* | 11/2016 | Zhou | G06F 3/0412 | |
| 2016/0364082 A1* | 12/2016 | Kimura | G06F 3/044 | |

FOREIGN PATENT DOCUMENTS

| | | |
|---|---|---|
| CN | 102754055 A | 10/2012 |
| CN | 103105964 A | 5/2013 |
| CN | 103176640 A | 6/2013 |
| CN | 103186309 A | 7/2013 |
| CN | 103842461 A | 6/2014 |
| CN | 103853382 A | 6/2014 |
| CN | 104183302 A | 12/2014 |
| CN | 104216547 A | 12/2014 |
| KR | 2014015200 A | 2/2014 |

* cited by examiner

ONE GLASS SOLUTION TOUCH PANEL AND FABRICATING METHOD THEREOF

CROSS REFERENCE TO RELATED APPLICATIONS

This patent application claims the benefit and priority of Chinese Patent Application No. 201510334229.3 filed on Jun. 16, 2015, the entire content of which is incorporated herein by reference.

BACKGROUND

The present disclosure relates to the technical field of semiconductors, and particularly, to a one glass solution touch panel and a fabricating method thereof.

The One Glass Solution (OGS) touch screen integrates the conductive glass and the protective glass onto one piece of glass, which can save one layer of glass and reduce the cost of one attachment, decrease the weight and thickness of the touch screen, and improve the transmittance of the touch screen, thereby achieving the advantages of a simple, light, and thin structure with a good transparency, and having a wide market prospect.

The fabricating procedure of the OGS touch screen includes a sensor process and an attachment process. The sensor process forms a black matrix, an electrode, etc. on a substrate to fabricate a touch panel, and the attachment process attaches the touch panel to the display screen to fabricate a touch screen. Protective adhesive will be coated on the substrate after the sensor process to prevent the substrate from being damaged in the attachment process. But the substrate is still damaged in the sensor process, which decreases the yield rate of the OGS touch panel.

BRIEF DESCRIPTION

This section provides a general summary of the disclosure, and is not a comprehensive disclosure of its full scope or all of its features.

The embodiments of the present disclosure provide an OGS touch panel and a fabricating method thereof, which can solve the problem that the substrate of the prior art is damaged in the sensor process and the yield of the OGS touch panel is decreased. The technical solutions are as follows.

In one aspect, a fabricating method of an OGS touch panel is provided. The method includes forming a protective layer on a first surface of a substrate, forming a black matrix, a plurality of first electrodes, a plurality of second electrodes, a first over coat layer and a plurality of conductive bridges on a second surface of the substrate which is opposite to the first surface, and wherein the second surface includes a visual area where the first electrode and the second electrode are alternatively provided, and a non-visual area where the black matrix is provided, the second electrode includes a plurality of conductive lumps provided at intervals along an extending direction of the second electrode, and each of the conductive lumps is located between adjacent first electrodes, the first over coat layer is on the first electrode and the second electrode and separates the conductive lump from the first electrodes, the conductive bridge is provided on the first over coat layer and connects the conductive lumps belonging to the same second electrode.

In one embodiment, the protective layer includes a resin protective layer.

Optionally, the material of the resin protective layer includes a polymer monomer of one of phenol formaldehyde resin, unsaturated polyester, polyethylene, polyvinyl chloride, polyethylene terephthalate and cellulose, or a copolymer thereof.

Optionally, the resin protective layer has a thickness of 2 μm to 20 μm.

In a possible implementation, the fabricating method further includes forming a metal layer on the black matrix, and forming a second over coat layer on the metal layer and the conductive bridge.

In one embodiment, the fabricating method further includes forming removable adhesive on the second over coat layer and the resin protective layer, respectively.

Optionally, the fabricating method further includes cutting the substrate, and removing the removable adhesive and the resin protective layer.

In one embodiment, the material of the resin protective layer further includes a degradable polymer material.

Further, the fabricating method includes, before removing the removable adhesive and the resin protective layer, preprocessing the resin protective layer to break molecular bonds of the degradable polymer material.

Specifically, preprocessing the resin protective layer to break molecular bonds of the degradable polymer material includes illuminating or heating the resin protective layer.

In another aspect, a fabricating method of a display device is provided. The method includes the aforementioned fabricating method of a one glass solution touch panel.

In still another aspect, an OGS touch panel is provided. The touch panel includes a substrate, a protective layer on the substrate, and a black matrix, a plurality of first electrodes, a plurality of second electrodes, a first over coat layer, and a plurality of conductive bridges covering a second surface of the substrate, wherein the second surface is opposite to the first surface, and wherein, the second surface includes a visual area where the first electrode and the second electrode are alternatively provided, and a non-visual area where the black matrix is provided, the second electrode includes a plurality of conductive lumps provided at intervals along an extending direction of the second electrode, and each of the conductive lumps is located between adjacent first electrodes, the first over coat layer is on the first electrode and the second electrode and separates the conductive lump from the first electrode the conductive bridge is provided on the first over coat layer and connects the conductive lumps belonging to the same second electrode.

In one embodiment, the protective layer includes a resin protective layer.

Optionally, the material of the resin protective layer includes a polymer monomer of one of phenol formaldehyde resin, unsaturated polyester, polyethylene, polyvinyl chloride, polyethylene terephthalate and cellulose, or a copolymer thereof.

Optionally, the resin protective layer has a thickness of 2 μm to 20 μm.

In one embodiment, the one glass solution touch panel further includes a metal layer provided on the black matrix, and a second over coat layer provided on the metal layer.

In a possible implementation, the OGS touch panel further includes removable adhesive covering the resin protective layer and the second over coat layer, respectively.

Optionally, the material of the resin protective layer further includes a degradable polymer material.

In yet another aspect, a display device is provided. The display device includes the aforementioned one glass solution touch panel.

The embodiments described herein have at least the following beneficial effect: a protective layer such as the resin protective layer is on the first surface of the substrate, and a black matrix is on the second surface of the substrate which is opposite to the first surface, so that the first surface of the substrate is protected, and the resin protective layer bears the damage in the sensor process other than the substrate. Thus the substrate is undamaged in the sensor process, and the yield rate of the OGS touch panel is increased. In addition, the resin protective layer may be peeled together with the removable adhesive from the substrate in the attachment process, without influencing the subsequent use of the substrate.

BRIEF DESCRIPTION OF THE DRAWINGS

In order to more clearly describe the technical solutions in the embodiments described herein, the drawings to be used in the descriptions of the embodiments will be briefly introduced as follows. Obviously, the following drawings just illustrate some embodiments of the disclosure, and a person skilled in the art can obtain other drawings from them without paying any creative effort.

In order that the technical solutions and advantages of the disclosure are clearer, the technical solutions of the embodiments of the disclosure will be clearly and completely described with reference to the drawings of the example embodiments of the disclosure. Obviously, those described are just a part, rather than all, of the embodiments of the disclosure. Any other embodiment obtained by a person skilled in the art based on the described embodiments of the disclosure shall fall within the protection scope of the disclosure.

Unless otherwise specified, the technical or scientific terms used herein shall be normal meanings understood by those of ordinary skills in the field of the present disclosure. The words "first", "second" and the similar used in the Description and claims of the patent application of the disclosure do not indicate any sequence, number or importance, but just distinguish different constituent parts.

For purposes of the description hereinafter, the terms "upper", "lower", "right", "left", "vertical", "horizontal", "top", "bottom", and derivatives thereof shall relate to the embodiments described herein, as it is oriented in the drawing figures. The terms "overlying", "atop", "positioned on " or "positioned atop" means that a first element, such as a first structure, is present on a second element, such as a second structure, wherein intervening elements, such as an interface structure, e.g. interface layer, may be present between the first element and the second element. The term "direct contact" means that a first element, such as a first structure, and a second element, such as a second structure, are connected without any intermediary conducting, insulating or semiconductor layers at the interface of the two elements.

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

Figure 1:
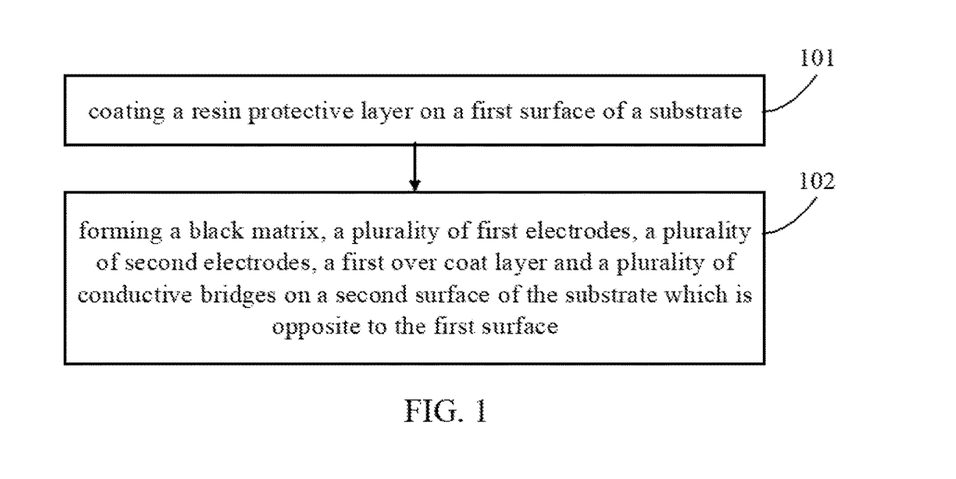
FIG. 1 is a flow chart of a fabricating method of an OGS touch panel provided by an embodiment.

An example embodiment provides a fabricating method of an OGS touch panel. Referring to FIG. 1, the fabricating method includes:

step 101: coating a resin protective layer on a first surface of a substrate; and step 102: forming a black matrix, a plurality of first electrodes, a plurality of second electrodes, a first over coat layer and a plurality of conductive bridges on a second surface of the substrate, wherein the second surface is opposite to the first surface.

In this embodiment, the second surface includes a visual area where the first electrode and the second electrode are alternatively provided, and a non-visual area where the black matrix is provided. The second electrode includes a plurality of conductive lumps provided at intervals along an extending direction of the second electrode, and each of the conductive lumps is located between adjacent first electrodes. The first over coat layer is on the first electrode and the second electrode and separates the conductive lump from the first electrode. The conductive bridge is provided on the first over coat layer and connects the conductive lumps belonging to the same second electrode.

In the example embodiment, the resin protective layer is on the first surface of the substrate, and the black matrix is on the second surface of the substrate which is opposite to the first surface, so that the first surface of the substrate is protected, and the resin protective layer, other than the substrate, bears the damage in the sensor process. Thus, the substrate is undamaged in the sensor process, and the yield rate of the OGS touch panel is increased. In addition, the resin protective layer may be peeled together with the removable adhesive from the substrate in the attachment process, without influencing the subsequent use of the substrate.

Figure 2:
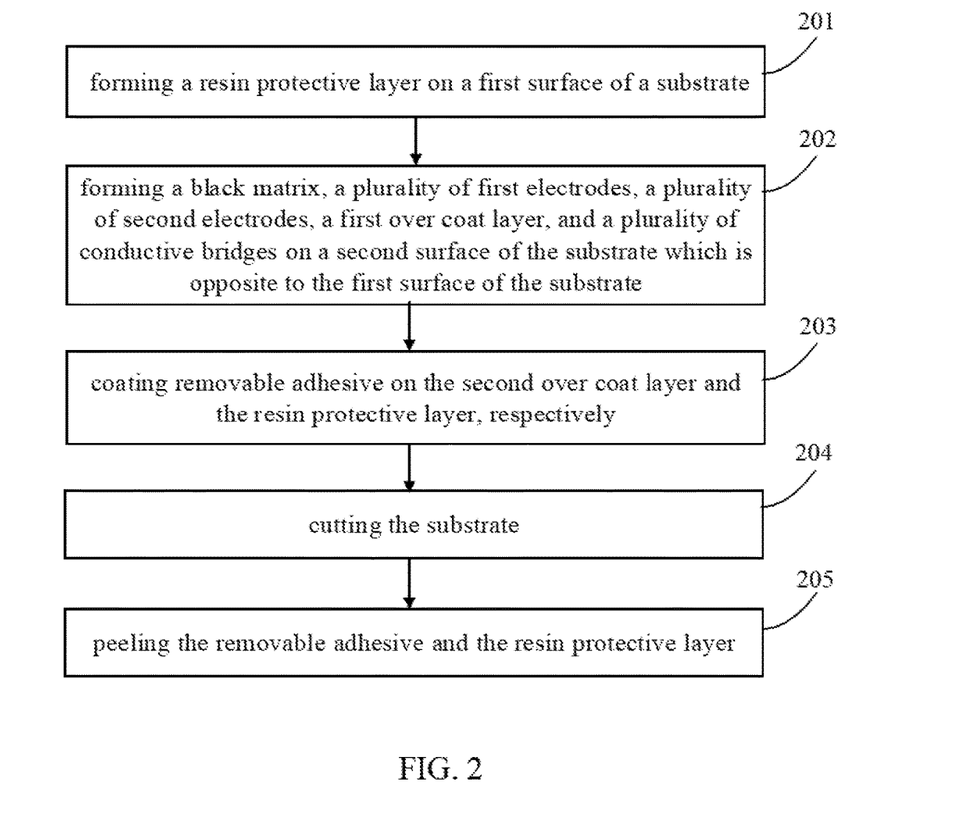
FIG. 2 is a flow chart of a fabricating method of an OGS touch panel provided by an embodiment.

An example embodiment provides a fabricating method of an OGS touch panel. Referring to FIG. 2, the fabricating method includes:

step 201: forming a resin protective layer on a first surface of a substrate.

Figure 3A:
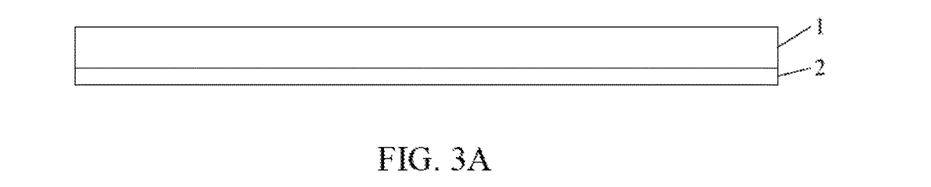
FIGS. 3A-3D are structure schematic diagrams in a fabricating process of an OGS touch panel provided by an embodiment.

FIG. 3A is a structure schematic diagram of the OGS touch panel after step 201 is performed, wherein 1 denotes a substrate and 2 denotes a resin protective layer.

Optionally, the material of the resin protective layer may include a polymer monomer of one of phenol formaldehyde resin, unsaturated polyester, polyethylene (PE), polyvinyl chloride (PVC), polyethylene terephthalate (PET) and cellulose, or a copolymer of multiple of them. For example, the material of the resin protective layer may include a polymer monomer of phenol formaldehyde resin, or a copolymer of phenol formaldehyde resin and unsaturated polyester. It should be noted that "multiple" means two or more.

In one embodiment, the material of the resin protective layer may include a copolymer of multiple of phenol formaldehyde resin, unsaturated polyester, PE, PVC, PET and cellulose. It can be appreciated that when the material of the resin protective layer includes a copolymer of multiple materials, characteristics such as hardness and easy peeling can be simultaneously ensured, so that the subsequent use of the substrate will not be influenced while the substrate is protected.

Optionally, the thickness of the resin protective layer may be 2 µm to 100 µm. It can be appreciated that if the thickness of the resin protective layer is less than 2 µm, the protection effect of the substrate is influenced; and if the thickness of the resin protective layer is more than 100 µm, on one hand the material is wasted, and on the other hand the peeling of the protection layer is inconvenient.

In one embodiment, the thickness of the resin protective layer may be 2 µm to 20 µm. To be noted, most of the layers in the OGS touch screen have a thickness of no more than 20 µm, and if the resin protective layer also has a thickness of no more than 20 µm, the OGS touch screen can be implemented with the existing device, which reduces the implementation cost.

Step 202: forming a black matrix, a plurality of first electrodes, a plurality of second electrodes, a first over coat layer, and a plurality of conductive bridges on a second surface of the substrate. The second surface is opposite to the first surface of the substrate.

In one embodiment, the second surface includes a visual area where the first electrode and the second electrode are alternatively provided, and a non-visual area where the black matrix is provided. The second electrode includes a plurality of conductive lumps provided at intervals along an extending direction thereof, and each of the conductive lumps is located between adjacent first electrodes. The first over coat layer is on the first electrode and the second electrode and separates the conductive lump from the first electrode. The conductive bridge is provided on the first over coat layer and connects the conductive lumps belonging to the same second electrode. A metal layer is provided on the black matrix and connected with the first electrode and the second electrode, respectively. A second over coat layer is provided on the metal layer, the conductive bridge and the second electrode.

Figure 3B:
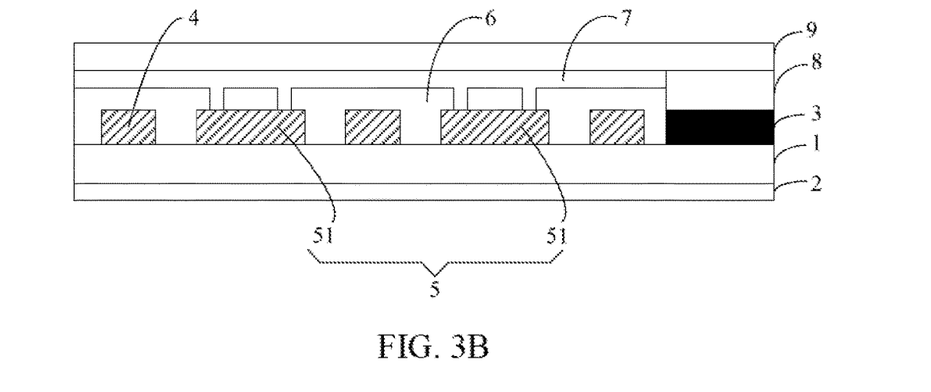

FIG. 3B is a structure schematic diagram of the OGS touch panel after step 202 is performed, wherein 1 denotes a substrate, 2 denotes a resin protective layer, 3 denotes a black matrix, 4 denotes a first electrode, 5 denotes a second electrode, 51 denotes a conductive lump, 6 denotes a first over coat layer, 7 denotes a conductive bridge, 8 denotes a metal layer, and 9 denotes a second over coat layer.

Optionally, step 202 may include
performing a vacuum sputtering plating on the second surface of the substrate to plate a layer of niobium oxide and form an Anti-Reflection (AR) layer, thereby eliminating the etched patterns;
coating a Black Matrix (BM) material (e.g., resin) on the non-visual area of the AR plated layer, and photo-etching the coated BM material (e.g., resin) to form a BM;
performing a vacuum sputtering plating on the visual area of the AR plated layer to plate a layer of Indium Tin Oxide (ITO) and form a plurality of first electrodes and second electrodes provided alternatively; the second electrode includes a plurality of conductive lumps provided at intervals along an extending direction thereof, and each of the conductive lumps is located between adjacent first electrodes;

covering the first electrode and the second electrode with an insulation layer to form a first Over Coat (OC) layer that separates the conductive lump and the first electrode from each other;
performing a vacuum sputtering plating on the first OC layer to plate a layer of ITO and form a plurality of conductive bridges connected to the conductive lumps belonging to the same second electrode;
depositing a metal film layer on the BM to form a metal trace layer connected to the first electrode and the second electrode, respectively; and
covering an insulation layer on the metal layer, the conductive bridge and the second electrode to form a second OC layer.

To be noted, at least some known methods form a black matrix, a plurality of first electrodes, a plurality of second electrodes, a first over coat layer, a plurality of conductive bridges, a metal layer and a second over coat layer on the substrate. The above implementation procedure of step 202 is just an example, and no limitation is made in the present disclosure.

Step 203: coating removable adhesive on the second over coat layer and the resin protective layer, respectively.

Figure 3C:
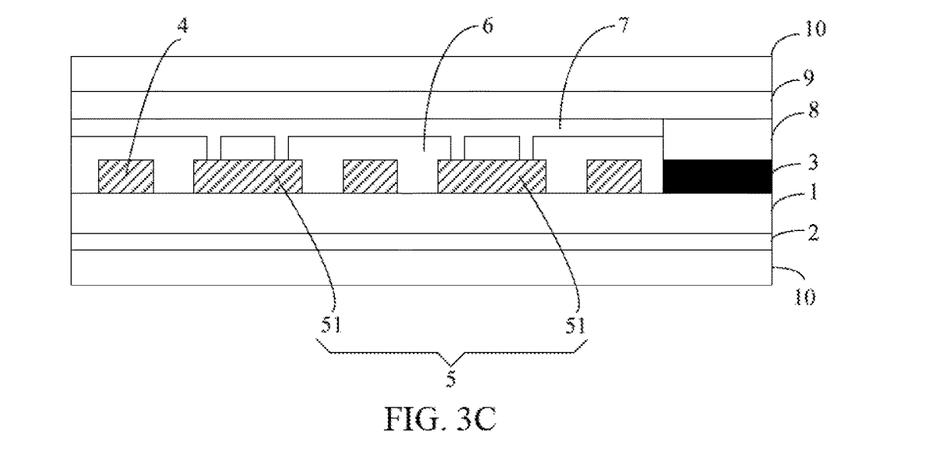

FIG. 3C is a structure schematic diagram of the OGS touch panel after step 203 is performed, wherein 1 denotes a substrate, 2 denotes a resin protective layer, 3 denotes a black matrix, 4 denotes a first electrode, 5 denotes a second electrode, 51 denotes a conductive lump, 6 denotes a first over coat layer, 7 denotes a conductive bridge, 8 denotes a metal layer, 9 denotes a second over coat layer, and 10 denotes removable adhesive.

Optionally, step 203 may include:
screen-printing acid-resistant removable adhesive on the second over coat layer and the resin protective layer, respectively.

To be noted, at least some known systems coat removable adhesive. The above implementation procedure of step 203 is just an example, and no limitation is made in the present disclosure.

It can be appreciated that the removable adhesive is coated for the purpose of protecting the surfaces of the second over coat layer and the substrate, and preventing the second over coat layer being scratched in the cutting procedure of the substrate (refer to step 204 for details).

Step 204: cutting the substrate.

It can be appreciated that the fabricating procedure of an OGS touch panel is to perform operations such as film plating on a substrate of a large area so as to provide a black matrix, electrodes, etc. on the substrate concentratedly, and then cut the substrate provided with the black matrix, electrodes, etc. into several pieces so as to obtain an OGS touch panel.

Optionally, step 204 may include:
cutting the substrate with a cutter-wheel cutting machine, a CO2 laser cutting machine or a laser cutting machine; and
polishing edges of the cut substrate with a computer numerical control cutting machine (CNC).

Specifically, the cutter-wheel cutting machine cuts the substrate through a mechanical stress in a preset cutting locus, and either a straight-line cutting or a special-shape cutting is feasible. The CO2 laser cutting machine focuses a laser beam onto a surface of the material to melt it, and blows off the melted material with an exhaust fan, thereby achieving a straight-line cutting. The laser cutting machine also focuses a laser beam onto a surface of the material for cutting, thereby achieving either a straight-line cutting or a special-shape cutting.

To be noted, at least some known methods cut the substrate. The above implementation procedure of step 204 is just an example, and no limitation is made in the present disclosure.

Step 205: peeling the removable adhesive and the resin protective layer.

Figure 3D:
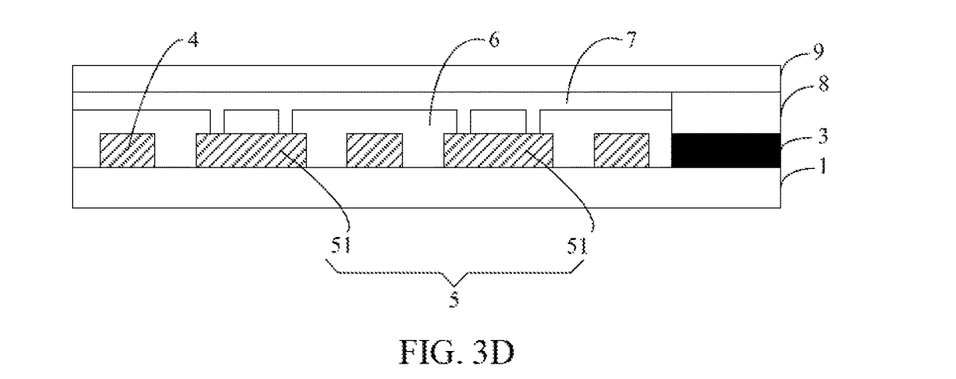

FIG. 3D is a structure schematic diagram of the OGS touch panel after step 205 is performed, wherein 1 denotes a substrate, 3 denotes a black matrix, 4 denotes a first electrode, 5 denotes a second electrode, 51 denotes a conductive lump, 6 denotes a first over coat layer, 7 denotes a conductive bridge, 8 denotes a metal layer, and 9 denotes a second over coat layer.

Optionally, step 205 may include:

directly tearing off the removable adhesive and the resin protective layer from the substrate.

To be noted, at least some known methods peel the removable adhesive. The above implementation procedure of step 205 is just an example, and no limitation is made in the present disclosure.

Optionally, the material of the resin protective layer may further include the degradable polymer material, such as acrylic of the light degradation polymer material, and natural fiber, polymethyl methacrylate, boron phenolic resin or chlorinated polypropylene in the thermal degradation polymer material.

Further, before step 205 is performed, the fabricating method of the OGS touch screen may further include:

preprocessing the resin protective layer and rupturing molecular bonds of the degradable polymer material to decrease the adhesive force between the resin protective layer and the glass substrate, so that the removable adhesive can be easily tore off and the substrate will not be easily damaged.

Specifically, preprocessing the resin protective layer and rupturing molecular bonds of the degradable polymer material may include:

illuminating or heating the resin protective layer.

It is easily known that after step 205 is performed, a Flexible Printed Circuit board (FPC) and a Liquid Crystal Display Module (LCM) may be provided to obtain an OGS touch screen.

Optionally, providing an FPC and an LCM may include:

binding the FPC on the substrate, and connecting the FPC to the metal trace layer;

attaching the LCM to the second OC layer.

To be noted, at least some known methods attach the FPC to the LCM. The above implementation procedure is just an example, and no limitation is made in the present disclosure.

In the example embodiment, the resin protective layer is on the first surface of the substrate, and the black matrix is on the second surface of the substrate which is opposite to the first surface, so that the first surface of the substrate is protected, and the resin protective layer bears the damage in the sensor process other than the substrate. Thus the substrate is undamaged in the sensor process, and the yield rate of the OGS touch panel is increased. In addition, the resin protective layer may be peeled together with the removable adhesive from the substrate in the attachment process, without influencing the subsequent use of the substrate.

Figure 4:
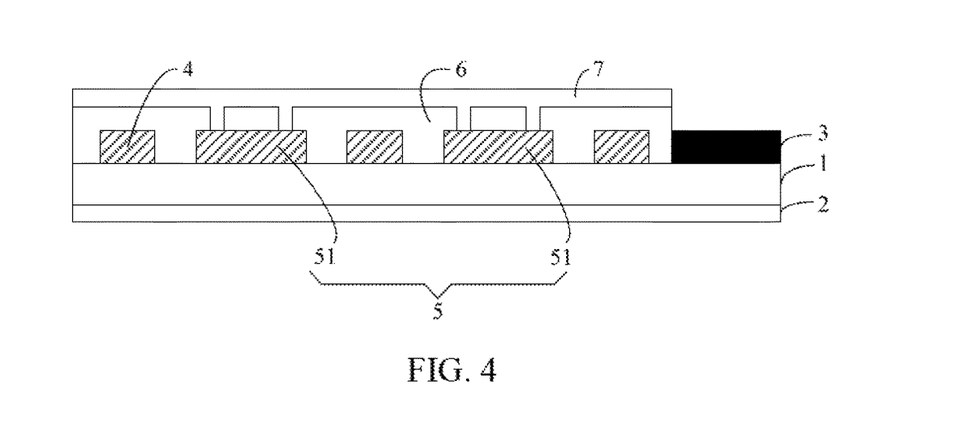
FIG. 4 is a structure schematic diagram of an OGS touch panel provided by an embodiment.

An example embodiment provides an OGS touch panel, which can be obtained with the above fabricating method of an OGS touch panel. Referring to FIG. 4, the OGS touch panel includes a substrate 1, a resin protective layer 2 covering a first surface of the substrate 1, a black matrix 3 covering a second surface of the substrate 1 which is opposite to the first surface, a plurality of first electrodes 4, a plurality of second electrodes 5, a first over coat layer 6, and a plurality of conductive bridges 7.

In this embodiment, the second surface includes a visual area where the first electrodes 4 and the second electrodes 5 are alternatively provided, and a non-visual area where the black matrix 3 is provided. The second electrode 5 includes a plurality of conductive lumps 51 provided at intervals along an extending direction thereof, and each of the conductive lumps 51 is located between adjacent first electrodes 4. The first over coat layer 6 covers the first electrode 4 and the second electrode 5 and separates the conductive lump 51 and the first electrode 4 from each other. The conductive bridge 7 is provided on the first over coat layer 6 and connected to the conductive lumps 51 belonging to the same second electrode 5.

In the example embodiment, the resin protective layer covers the first surface of the substrate, and the black matrix is on the second surface of the substrate which is opposite to the first surface, so that the first surface of the substrate is protected, and the resin protective layer bears the damage in the sensor process other than the substrate. Thus the substrate is undamaged in the sensor process, and the yield rate of the OGS touch panel is increased. In addition, the resin protective layer may be peeled together with the removable adhesive from the substrate in the attachment process, without influencing the subsequent use of the substrate.

Figure 5:
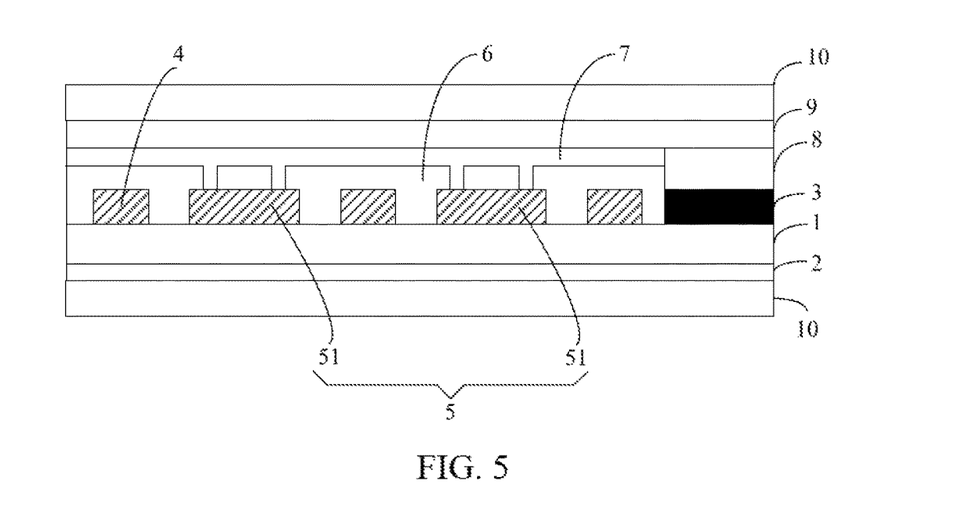
FIG. 5 is a structure schematic diagram of an OGS touch panel provided by an embodiment.

An example embodiment provides an OGS touch panel, which can be obtained with the above fabricating method of an OGS touch panel. Referring to FIG. 5, the OGS touch panel includes a substrate 1, a resin protective layer 2 on a first surface of the substrate 1, a black matrix 3 on a second surface of the substrate 1 which is opposite to the first surface, a plurality of first electrodes 4, a plurality of second electrodes 5, a first over coat layer 6, a plurality of conductive bridges 7, a metal layer 8 and a second over coat layer 9.

In this embodiment, the second surface includes a visual area where the first electrodes 4 and the second electrodes 5 are alternatively provided, and a non-visual area where the black matrix 3 is provided. The second electrode 5 includes a plurality of conductive lumps 51 provided at intervals along an extending direction thereof, and each of the conductive lumps 51 is located between adjacent first electrodes 4. The first over coat layer 6 covers the first electrode 4 and the second electrode 5 and separates the conductive lump 51 and the first electrode 4 from each other. The conductive bridge 7 is provided on the first over coat layer 6 and connected to adjacent conductive lumps 51 belonging to the same second electrode 5. The metal layer 8 is provided on the black matrix 3 and connected to the first electrode 4 and the second electrode 5, respectively. The second over coat layer 9 is provided on the metal layer 8, the conductive bridge 7 and the second electrode 5.

Optionally, the material of the resin protective layer 2 may include a polymer monomer of one of phenol formaldehyde resin, unsaturated polyester, PE, PVC, PET and cellulose, or a copolymer of multiple of them.

In one embodiment, the material of the resin protective layer 2 may include a copolymer of multiple of phenol formaldehyde resin, unsaturated polyester, PE, PVC, PET and cellulose. It can be appreciated that when the material of the resin protective layer 2 is a copolymer of multiple materials, characteristics such as hardness and easy peeling can be simultaneously ensured, so that the subsequent use of the substrate will not be influenced while the substrate is protected.

Optionally, the thickness of the resin protective layer 2 may be 2 µm to 100 µm. It can be appreciated that if the thickness of the resin protective layer 2 is less than 2 µm, the protection effect of the substrate is influenced; and if the thickness of the resin protective layer 2 is more than 100 µm, on one hand the material is wasted, and on the other hand the peeling of the protection layer is inconvenient.

In one embodiment, the thickness of the resin protective layer 2 may be 2 µm to 20 µm. To be noted, most of the layers in the OGS touch screen have a thickness not more than 20 µm, and if the resin protective layer 2 also has a thickness no more than 20 µm, the OGS touch screen can be implemented with the existing device, which reduces the implementation cost.

Optionally, the OGS touch panel may include removable adhesive 10 covering the resin protective layer 2 and the second over coat layer 8, respectively.

In one embodiment, the material of the resin protective layer 2 may further include the degradable polymer material to preprocess (illuminate or heat) the resin protective layer before the resin protective layer is peeled, break the molecular bonds of the degradable polymer material, and decrease the adhesive force between the resin protective layer and the glass substrate, so that the removable adhesive can be easily tore off and the substrate will not be easily damaged.

In the embodiments described herein, the resin protective layer is on the first surface of the substrate, and the black matrix is on the second surface of the substrate which is opposite to the first surface, so that the first surface of the substrate is protected, and the resin protective layer bears the damage in the sensor process other than the substrate. Thus the substrate is undamaged in the sensor process, and the yield rate of the OGS touch panel is increased. In addition, the resin protective layer may be peeled together with the removable adhesive from the substrate in the attachment process, without influencing the subsequent use of the substrate.

The above descriptions are just example embodiments of the disclosure, rather than limitations thereto. Any amendment, equivalent replacement and improvement made within the spirit and principle of the disclosure shall fall within the protection scope of the disclosure.

What is claimed is:

1. A method for fabricating a one glass solution touch panel, the method comprising:
   forming a protective layer on a first surface of a substrate; and
   forming a black matrix, a plurality of first electrodes, a plurality of second electrodes, a first over coat layer, and a plurality of conductive bridges on a second surface of the substrate, wherein the second surface is opposite the first surface;
   wherein the second surface comprises a visual area in which the first electrodes and the second electrodes are arranged in an alternating pattern, and a non-visual area where the black matrix is provided, wherein the second electrode comprises a plurality of conductive lumps provided at intervals along an extending direction of the second electrode, wherein each of the conductive lumps is located between adjacent first electrodes, wherein the first over coat layer is on the first electrodes and the second electrodes and separates the conductive lumps from the first electrodes, and wherein each conductive bridge is on the first over coat layer and connects the conductive lumps belonging to the same second electrode.

2. The fabricating method according to claim 1, wherein the protective layer comprises a resin protective layer.

3. The fabricating method according to claim 2, wherein the material of the resin protective layer comprises a polymer monomer of one of phenol formaldehyde resin, unsaturated polyester, polyethylene, polyvinyl chloride, polyethylene terephthalate, and cellulose, or a copolymer thereof.

4. The fabricating method according to claim 2, wherein the resin protective layer has a thickness of 2 µm to 20 µm.

5. The fabricating method according to claim 2, further comprising:
   forming a metal layer on the black matrix; and
   forming a second over coat layer on the metal layer and the conductive bridge.

6. The fabricating method according to claim 5, further comprising:
   forming removable adhesive on the second over coat layer and the resin protective layer, respectively.

7. The fabricating method according to claim 6, further comprising:
   cutting the substrate; and
   removing the removable adhesive and the resin protective layer.

8. The fabricating method according to claim 7, wherein the material of the resin protective layer further comprises a degradable polymer material.

9. The fabricating method according to claim 8, further comprising:
   before removing the removable adhesive and the resin protective layer, preprocessing the resin protective layer to break molecular bonds of the degradable polymer material.

10. The fabricating method according to claim 9, wherein preprocessing the resin protective layer to break molecular bonds of the degradable polymer material comprises:
    illuminating or heating the resin protective layer.

11. A method for fabricating a display device, comprising the method of fabricating a one glass solution touch panel according to claim 1.

12. A one glass solution touch panel, comprising:
    a substrate;
    a protective layer on a first surface of the substrate; and
    a black matrix, a plurality of first electrodes, a plurality of second electrodes, a first over coat layer, and a plurality of conductive bridges on a second surface of the substrate, wherein the second surface is opposite the first surface;
    wherein the second surface comprises a visual area in which the first electrodes and the second electrodes are arranged in an alternating pattern, and a non-visual area where the black matrix is provided, wherein the second electrode comprises a plurality of conductive lumps provided at intervals along an extending direction of the second electrode, wherein each of the conductive lumps is located between adjacent first electrodes, wherein the first over coat layer is on the first electrodes and the second electrodes and separates the conductive lumps from the first electrodes, and wherein each conductive bridge is on the first over coat layer and connects the conductive lumps belonging to the same second electrode.

13. The one glass solution touch panel according to claim 12, wherein the protective layer comprises a resin protective layer.

14. The one glass solution touch panel according to claim 13, wherein the material of the resin protective layer comprises a polymer monomer of one of phenol formaldehyde resin, unsaturated polyester, polyethylene, polyvinyl chloride, polyethylene terephthalate, and cellulose, or a copolymer thereof.

15. The one glass solution touch panel according to claim 13, wherein the resin protective layer has a thickness of 2 μm to 20 μm.

16. The one glass solution touch panel according to claim 13, further comprising a metal layer provided on the black matrix, and a second over coat layer provided on the metal layer.

17. The one glass solution touch panel according to claim 16, further comprising removable adhesive covering the resin protective layer and the second over coat layer, respectively.

18. The one glass solution touch panel according to claim 17, wherein the material of the resin protective layer further comprises a degradable polymer material.

19. A display device, comprising the one glass solution touch panel according to claim 12.

* * * * *